(12) United States Patent
Ko et al.

(10) Patent No.: US 10,135,577 B2
(45) Date of Patent: Nov. 20, 2018

(54) SCALABLE SERVICE IN A WIRELESS COMMUNICATION SYSTEM

(71) Applicant: LG Electronics Inc., Seoul (KR)

(72) Inventors: Hyunsoo Ko, Seoul (KR); Heejeong Cho, Seoul (KR); Hyeyoung Choi, Seoul (KR); Ilmu Byun, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 699 days.

(21) Appl. No.: 14/635,397

(22) Filed: Mar. 2, 2015

(65) Prior Publication Data

US 2016/0261380 A1    Sep. 8, 2016

(51) Int. Cl.
*H04L 1/18* (2006.01)
*H04L 5/00* (2006.01)
*H04L 1/16* (2006.01)

(52) U.S. Cl.
CPC .......... *H04L 1/1812* (2013.01); *H04L 1/1607* (2013.01); *H04L 1/1822* (2013.01); *H04L 1/1851* (2013.01); *H04L 1/1887* (2013.01); *H04L 5/0055* (2013.01)

(58) Field of Classification Search
CPC ... H04L 1/1822; H04L 1/1607; H04L 1/1851; H04L 5/0055; H04L 1/1812; H04L 5/0007
See application file for complete search history.

(56) References Cited

U.S. PATENT DOCUMENTS

| | | | | |
|---|---|---|---|---|
| 2008/0170528 A1* | 7/2008 | Bosch | ............... | H04N 21/2221 370/312 |
| 2012/0300663 A1* | 11/2012 | Lu | ............... | H04L 1/1671 370/252 |
| 2012/0307685 A1* | 12/2012 | Kim | ............... | H04W 48/16 370/255 |
| 2015/0098510 A1* | 4/2015 | Ye | ............... | H04N 19/597 375/240.16 |
| 2015/0326360 A1* | 11/2015 | Malladi | ............... | H04L 5/0032 370/329 |
| 2015/0326867 A1* | 11/2015 | Kovacs | ............... | H04N 19/30 375/240.01 |

* cited by examiner

*Primary Examiner* — Redentor Pasia
*Assistant Examiner* — Peter K Mak
(74) *Attorney, Agent, or Firm* — Dentons US LLP (57) ABSTRACT

A method for providing scalable service in a wireless communication system is disclosed. In this method, the transmitting side device transmits base layer signals and enhancement layer signals for one scalable service to a user equipment (UE) based on a HARQ (Hybrid Automatic Repeat Request) scheme. The base layer signals can be independently used at the UE without the enhancement layer signals. On the other hand, the enhancement layer signals cannot be used at the UE without the base layer signals. The transmitting side device also retransmits the base layer signals before a retransmission of the enhancement layer signals when there are both of the base layer signals and the enhancement layer signals to be retransmitted based on the HARQ scheme.

8 Claims, 6 Drawing Sheets

control - plane protocol stack

FIG. 2(b)

user - plane protocol stack

SCALABLE SERVICE IN A WIRELESS COMMUNICATION SYSTEM

BACKGROUND OF THE INVENTION

Field of the Invention

The present invention relates to scalable service in a wireless communication system, where the scalable service is provided by separate layer signals.

Discussion of the Related Art

As an example of a wireless communication system to which the present invention is applicable, a 3rd generation partnership project (3GPP) long term evolution (LTE) communication system will be schematically described.

Figure 1:
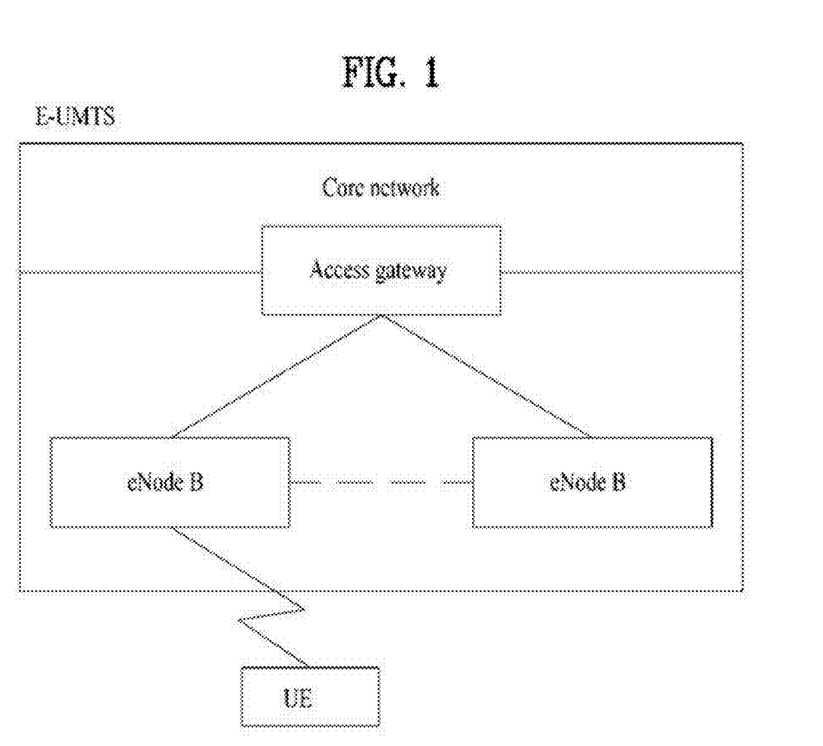
FIG. 1 is a diagram showing a network structure of an Evolved Universal Mobile Telecommunications System (E-UMTS) as an example of a wireless communication system.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to provide scalable service in a wireless communication system, where a Quality of Service (QoS) is more flexibly adjusted in actual wireless environment.

SUMMARY OF THE INVENTION

Accordingly, the present invention is directed to methods for providing scalable service and for receiving scalable service in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing scalable service in a wireless communication system is provided. The method comprises: transmitting base layer signals and enhancement layer signals for one scalable service to a user equipment (UE) based on a HARQ (Hybrid Automatic Repeat Request) scheme, wherein the base layer signals can be independently used at the UE without the enhancement layer signals, and wherein the enhancement layer signals cannot be used at the UE without the base layer signals; and retransmitting the base layer signals before a retransmission of the enhancement layer signals when there are both of the base layer signals and the enhancement layer signals to be retransmitted based on the HARQ scheme.

The method may further comprise: retransmitting the enhancement layer signals when there are the enhancement layer signals to be retransmitted and there is no base layer signal to be retransmitted.

The transmission of the base layer signals may be managed by one or more first HARQ processes, and the transmission of the enhancement layer signals may be managed by one or more second HARQ processes.

Here, the first HARQ processes may determine whether a first type ACK/NACK signal for the base layer signals is received, and the second HARQ processes may determine whether the first type ACK/NACK signal is received and whether a second type ACK/NACK signal for the enhancement layer signal is received.

The second HARQ processes may not determine whether the first type ACK/NACK signal is received and whether the second type ACK/NACK signal is received after a completion of successful transmission of the base layer signals.

The scalable service may comprise a service for providing video signals encoded based on scalable video coding (SVC). And, the base layer signals can be used at the UE for HD service, and the base layer signals and the enhanced layer signals can be used at the UE for UHD service.

The method may further comprise: starting a first timer (T1) when the initial transmission of the base layer signals and the enhancement layer signals started; and ceasing transmission or retransmission of one or more of the base layer signals and the enhancement layer signals when the first timer (T1) expires even though there are any of the base layer signals and the enhancement layer signals to be retransmitted.

The HARQ scheme may not use a maximum number of retransmission for the transmission of the base layer signals and the enhancement layer signals.

In another aspect of the present invention, a method for receiving scalable service in a wireless communication system is provided. The method comprises: receiving base layer signals and enhancement layer signals for one scalable service at a user equipment (UE) based on a HARQ (Hybrid Automatic Repeat Request) scheme, wherein the base layer signals can be independently used at the UE without the enhancement layer signals, and wherein the enhancement layer signals cannot be used at the UE without the base layer signals; and receiving retransmitted base layer signals before receiving retransmitted enhancement layer signals when there are both of the base layer signals and the enhancement layer signals to be retransmitted based on the HARQ scheme.

The method may further comprise: receiving retransmitted enhancement layer signals when there are the enhancement layer signals to be retransmitted and there is no base layer signal to be retransmitted.

The method may further comprise: starting a second timer (T2) when a initial reception of the base layer signals and the enhancement layer signals started; and discarding the base layer signals and the enhancement layer signals stored in a buffer when the second timer (T2) expires.

The base layer signals may be independently used by the UE without the enhancement layer signals if the reception of the enhancement layer signals is not finished when the second timer (T2) expires.

The scalable service may comprise a service for providing video signals encoded based on scalable video coding (SVC).

The base layer signals can be used by the UE for HD service, and the base layer signals and the enhanced layer signals can be used by the UE for UHD service.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition.

Figure 2A:
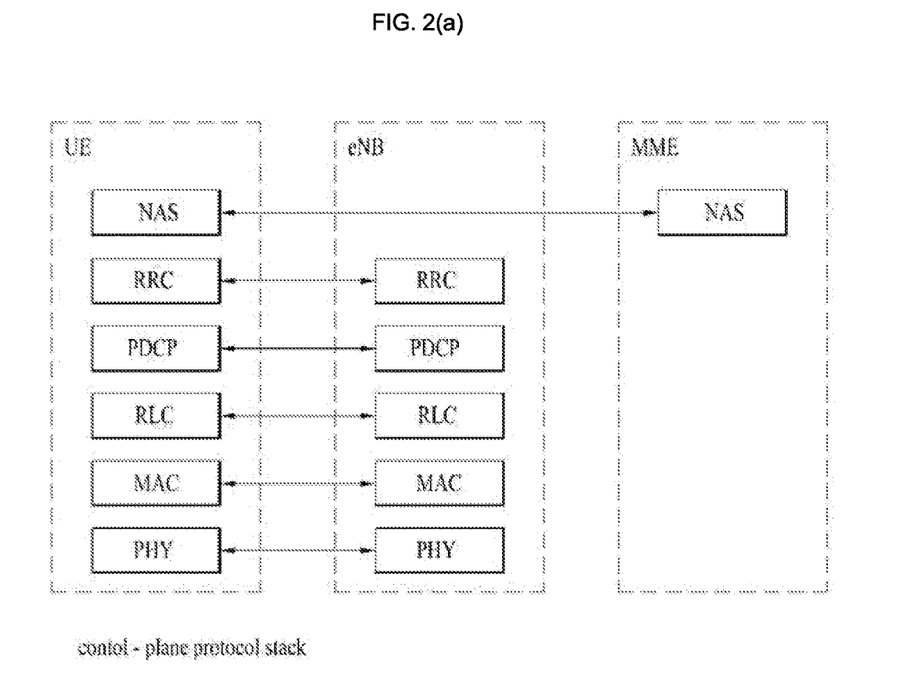
FIGS. 2(a) and 2(b) are diagrams showing a control plane and a user plane of a radio interface protocol between a UE and an E-UTRAN based on a 3rd generation partnership project (3GPP) radio access network standard.
Figure 2B:
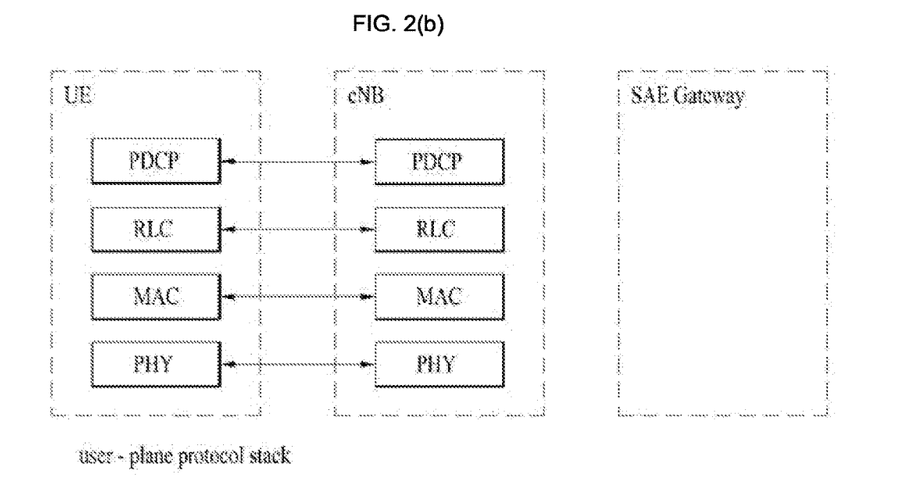

FIGS. 2(a) and 2(b) are diagrams showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 3:
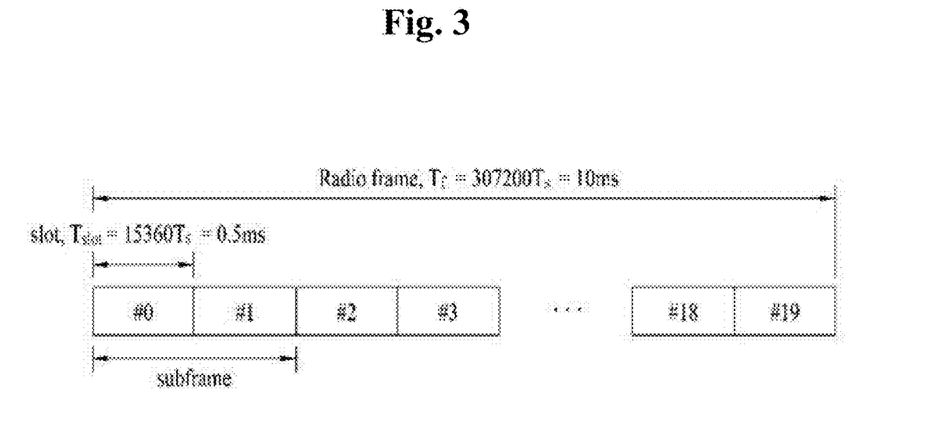
FIG. 3 is a diagram showing the structure of a radio frame used in a Long Term Evolution (LTE) system.

FIG. 3 is a diagram showing the structure of a radio frame used in an LTE system.

Referring to FIG. 3, the radio frame has a length of 10 ms (327200×$T_s$) and is divided into 10 subframes having the same size. Each of the subframes has a length of 1 ms and includes two slots. Each of the slots has a length of 0.5 ms (15360×$T_s$). Ts denotes a sampling time, and is represented by $T_s$=1/(15 kHz×2048)=3.2552×10$^{-8}$ (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

As stated above, the present invention is directed to providing scalable service in a wireless communication system including the above explained LTE based system. In one example, the 'scalable service' can be defined as a flexible QoS service depending on an actual wireless communication environment. For example, a single scalable service can be provided based on base layer signals and enhancement signals. The base layer signals can be independently used at the receiving side without the enhancement layer signals. But, if the service is provided based on both of the base layer signals and enhancement layer signals, higher quality service can be enjoyed.

Contrary to the base layer signals, enhancement layer signals cannot be used without the base layer signals. So, if the receiving side only acquired enhancement layer signals, the receiving side cannot independently use them. So, the enhancement layer signals provide optional information, and the receiving side can enjoy the service without them.

Figure 4:
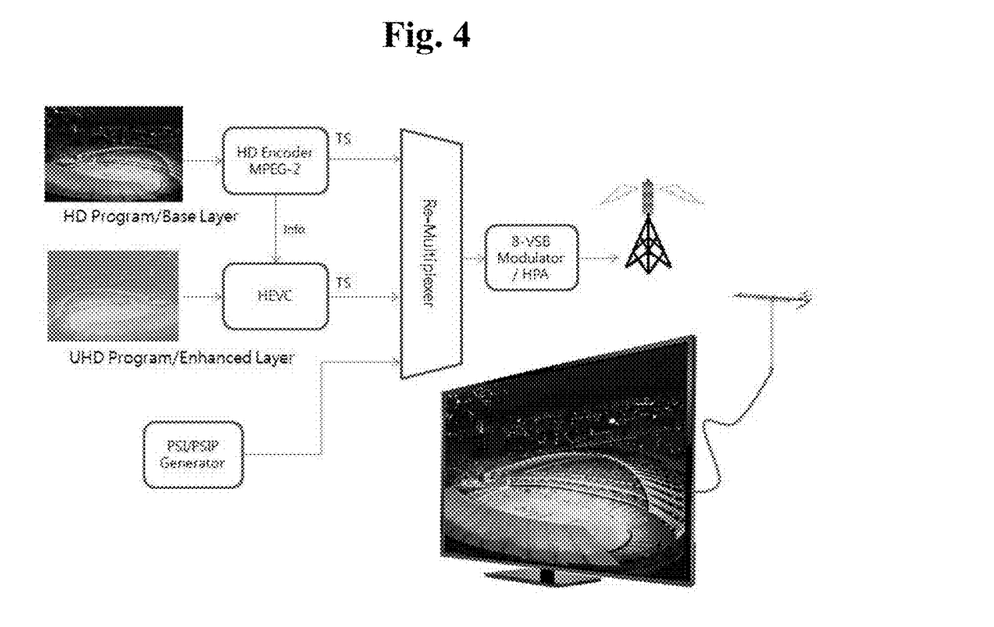
FIG. 4 is a diagram showing an example of scalable service to be provided by the present invention.

FIG. 4 is a diagram showing an example of scalable service to be provided by the present invention.

As an example, FIG. 4 is for explaining the concept of the video service based on SVC (Scalable Video Coding). SVC is a coding scheme employed by H.265/AVC Standard, and provide coding scheme to provide various resolution and frame rate. According to SVC scheme, base layer signals are for providing MPEG-2 HD contents, and enhancement layer signals are for providing HEVC contents. When the receiving side device received both of base layer signals and the enhancement layer signals, the device can enjoy UHD service. But, when the device cannot receive the enhancement layer signals, the device still can enjoy the HD service based on the base layer signals.

The above mentioned SVC based service is provided based on conventional broadcasting scheme (e.g. wired broadcasting service, DMB service). But, one of goal of 5G mobile communication technology is providing high quality media service such as UHD, hologram etc via wireless communication system as like LTE system. For this end, new scheme for wireless communication, such as HARQ scheme for scalable service, feedback scheme, etc, is required.

Table 1 shows the metric for HD and UHD service.

TABLE 1

| Resolution (30 fps) | Compressed Data Rate | HEVC |
|---|---|---|
| HD (1920 × 1080) | 9 Mbps | 5 Mbps |
| UHD (3840 × 2160) | 30 Mbps | 15 Mbps |

It would be better for video streaming service based on cellular communication system to consider mobile communication environment such as the degradation based on the distance and shadow due to buildings. So, different treat on base layer and enhancement layer is required. But, according to the current mobile communication system (e.g. 3GPP LTE/LTE-A system), the physical layer treats the signals from higher layer with the same priority. PHY/MAC layer of LTE system had been differently treated signals of different services with different priority. But, signals for the same service were treated with the same priority. But, the base layer signals and enhancement layer signals for one scalable service shall be treated with different priority for efficiency in the embodiments of the present invention.

Figure 5:
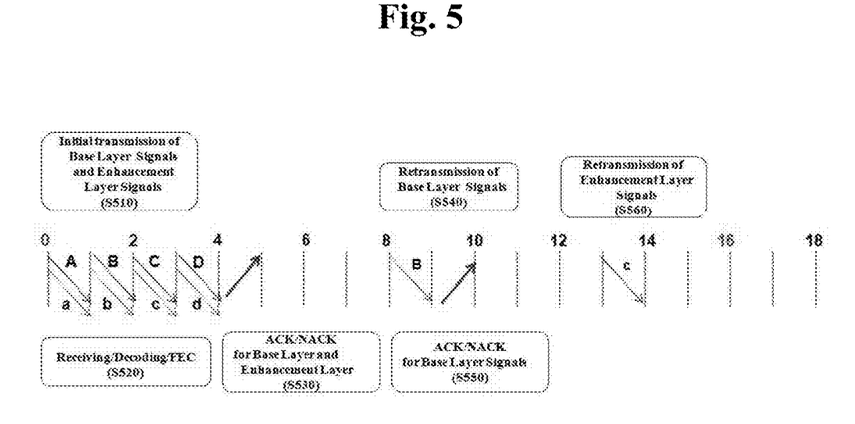
FIG. 5 is a diagram showing one example of providing scalable service according one embodiment of the present invention.

FIG. 5 is a diagram showing one example of providing scalable service according one embodiment of the present invention.

According to one embodiment of the present invention, the transmitting side device (e.g. eNB) may perform initial transmission of base layer signals and enhancement layer signals for one scalable service to a user equipment (UE) based on a HARQ (Hybrid Automatic Repeat Request) scheme (S510). This initial transmission can be directed to a single UE, but the receiving side can be multiple UE whose user subscribed and requested the scalable service.

In the example of FIG. 5, the initial transmission of base layer signals and enhancement layer signals are done in 4 consecutive time units, such as frame, subframe etc. Each of 'A', B', 'C' and 'D' represents base layer signals transmitted at each time unit. And, each of 'a', 'b', 'c' and 'd' represents enhancement layer signals transmitted at each time unit. As stated above, the base layer signals can be independently used at the UE without the enhancement layer signals. But, the enhancement layer signals cannot be used at the UE without the base layer signals.

The UE may receive and decode the base layer signals and the enhancement layer signals (S520). If all of the base layer signals (A, B, C and D) and the enhancement layer signals (a, b, c and d) are successfully decoded, the UE may send ACK to the transmitting side device and can enjoy the full scale service based on these received signals (S530). But, if all or a part of the base layer signals and the enhancement layer signals are failed to be decoded, the UE may send NACK to the eNB for the corresponding signals (S530).

According to this embodiment of the present invention, the retransmission of the base layer signals has higher priority than the retransmission of the enhancement layer signals. Thus, the retransmission of the base layer signals may be performed before the retransmission of the enhancement layer signals when there are both of the base layer signals and the enhancement layer signals to be retransmitted based on the HARQ scheme (S540). For example, when the base layer signals 'B' and the enhancement layer signal 'c' are to be retransmitted, the retransmission of the base layer signal 'B' is performed first. And, the retransmission of the enhancement layer signals 'c'' may be performed when there are the enhancement layer signals to be retransmitted and there is no base layer signal to be retransmitted (S560). When the UE successfully decode the retransmitted base layer signals (B), the UE may transmit ACK to the eNB (S550).

The transmission of the base layer signals and the transmission of the enhancement layer signals can be managed by different HARQ processes. That is, the transmission of the base layer signals may be managed by one or more first HARQ processes, and the transmission of the enhancement layer signals may be managed by one or more second HARQ processes, different from the first HARQ processes. First/second HARQ processes can be one HARQ process, but plurality of HARQ processes can be used for one of base layer and enhancement layer.

The first HARQ process may determine whether a first type ACK/NACK signal for the base layer signals is received. On the other hand, the second HARQ process may determine both of (a) whether the first type ACK/NACK signal for the base layer signals is received, and (b) whether a second type ACK/NACK signal for the enhancement layer signal is received. The first HARQ process need not determine whether the second type ACK/NACK signal for the enhancement layer signal is received since the retransmission of the base layer signals is triggered regardless of need for retransmission of the enhancement layer signals. On the other hand, the second HARQ process need to determine the feedback information for both of layers since the retransmission of the enhancement layer signals can be triggered after the retransmission of the base layer signals.

As stated above, the scalable service of this embodiment can be a service for providing video signals encoded based on scalable video coding (SVC). That is, the base layer signals may be video signals for HD service, while the enhancement layer signals may be optional HEVC video signals. But, the present embodiment does not restricted to the SVC based service and the scalable service can be any service in which the base layer signals are mandatory signals for service and the enhancement layer signals are optional signals for high quality service.

According to one example suitable for the embodiment based on the SVC service, the second HARQ processes may not determine whether the first type ACK/NACK signal for the base layer signal is received and whether the second type ACK/NACK signal for the enhancement layer signals is received after a completion of successful transmission of the base layer signals. For example of FIG. 5, after receiving ACK to the retransmitted base layer signal (B) (S550), the retransmission of enhancement layer signal may be performed regardless of whether it is successfully received.

When the scalable service is for SVC based streaming service, if the received video signals cannot be played within a predetermined time period, it can be obsolete and useless. In the example of FIG. 5, the streaming service image received after the 16$^{th}$ frame (or subframe) would be obsolete for the real time streaming service.

For this end, the eNB may start a first timer (T1) when the initial transmission of the base layer signals and the enhancement layer signals started. And, the eNB may cease transmission or retransmission of one or more of the base layer signals and the enhancement layer signals when the T1 expires even though there are any of the base layer signals and the enhancement layer signals to be retransmitted.

Likewise, the UE may start a second timer (T2) when the reception of the initial base layer signals and enhancement layer signals started. And, the UE may discards the base layer signals and the enhancement layer signals stored in a buffer when the T2 expires. If the base layer signals and the enhancement layer signals are successfully received while T2 is running, the UE may enjoy the UHD service. If only the base layer signals are successfully received while T2 is running, the UE may enjoy HD service. If the UE failed to successfully receive even the base layer signals, the UE cannot play the corresponding frame of image.

Thus, in order to meet this time constraint, the retransmission of the enhancement layer signals can be performed regardless of feedback information. There can be a case where the UE send NACK to the retransmitted enhancement layer signal (c), but further retransmission of 'c' cannot be performed within the time limitation based on T1/T2. So, the feedback for the retransmitted enhancement layer signals can be useless for some cases.

In another aspect of the present embodiment, the HARQ scheme does not use the maximum number of retransmission concept commonly used for conventional HARQ scheme. As stated above, when the scalable service has time constraint, the use of the maximum number of retransmission would be useless.

Figure 6:
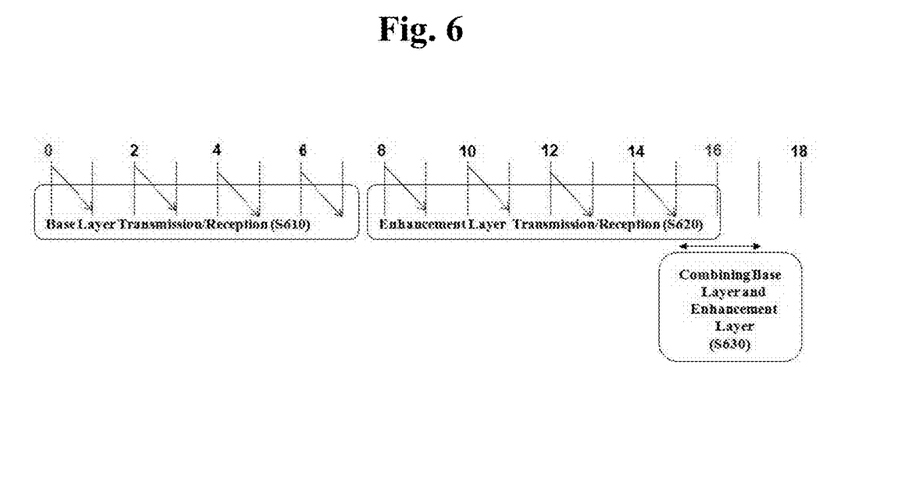
FIGS. 6 and 7 are diagrams showing examples of providing scalable service according another embodiment of the present invention.
Figure 7:
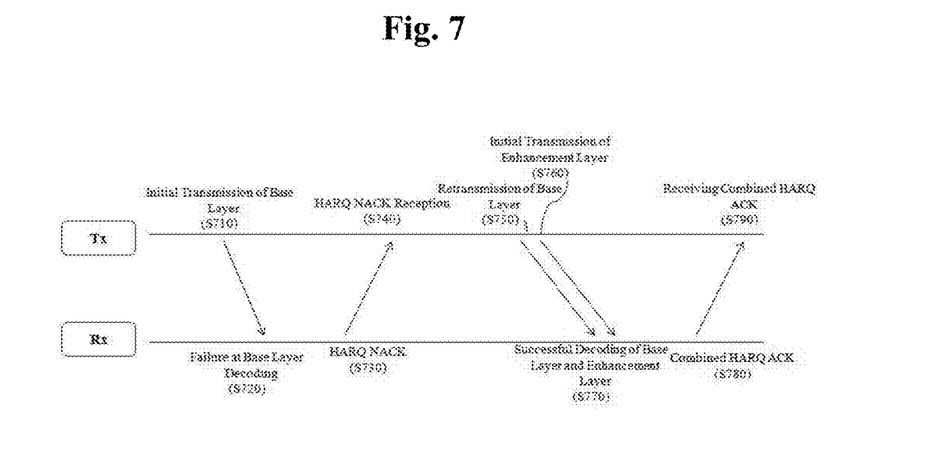

FIGS. 6 and 7 are diagrams showing examples of providing scalable service according another embodiment of the present invention.

In this embodiment, in order to ensure the safe receipt of the base layer signals within the time limit, the initial transmission of base layer signals is performed before the initial transmission of enhancement layer signals.

Referring to FIG. 6, the base layer signals transmission and reception are performed first (S610). After the transmission/reception of the base layer signals, the transmission/reception of the enhancement layer signals are performed (S620). When both of the base layer signals and the enhancement layer signals are successfully received within the time constraint, the UE may combine the base layer signals and the enhancement layer signals (S630). Based on this basic scheme, a HARQ scheme is applied for efficient scalable service.

Referring to FIG. 7, the eNB may perform initial transmission of base layer signals to the UE based on a HARQ scheme (S710). The UE may try to decode this base layer signals, but may fail to decode (a part of) the base layer signals (S720). In response, the UE may send HARQ NACK to the eNB (S730).

In response, the eNB may retransmit the corresponding base layer signals (S750). But, the initial transmission of enhancement layer signals is also performed while performing the initial transmission of the enhancement layer signals (S760). If the initial transmission of the enhancement layer signals is initiated after completion of decoding of the base layer signals, there would be a delay for the enhancement layer signals. So, according to this embodiment, the initial transmission of the enhancement layer signals is performed while the retransmission of the base layer signals is performed.

When the link adaptation is performed to make the successful reception rate of the initial transmission up to 90%, the successful reception rate of the retransmission becomes up to 99%. So, in a preferred embodiment of the present invention, the link adaptation is performed to make the successful reception rate of the initial base layer signals become more than 90%, to ensure that the successful reception rate of the retransmission becomes almost 100%.

If the UE successfully received the retransmitted base layer signals and the initially transmitted enhancement layer signals, the UE may send ACK to both of signals. In one example, the UE may use combined HARQ ACK for the combination of the base layer signals and the enhancement layer signals (S780). The eNB may process this combined HARQ ACK for both of the base layer and the enhancement layer (S790).

Preferably, the initial transmission of the enhancement layer (S760) may be initiated before receiving ACK/NACK for the initial transmission of the enhancement layer signals (S740). That is, in this embodiment, the initial transmission of the enhancement layer signals is initiated regardless of receiving NACK for the base layer signals. So, there is no need for the HARQ process managing the transmission of the enhancement layer signals to wait until receiving HARQ feedback for the base layer signals.

In another example, the transmission of enhancement layer signals may not be based on the HARQ scheme. Since the transmission of enhancement layer signals is initiated after the transmission of base layer signals, there can be only limited time to process the transmission of enhancement layer signals based on the HARQ scheme. Since the enhancement layer signals are optional signals for the scalable service, the transmission of them might not be based on the HARQ scheme. In this case, S780, S790 of FIG. 7 should be modified to transmit/receive ACK only for the base layer signals.

In this embodiment, the initial transmission and the retransmission of the base layer signals might be managed by one or more first HARQ processes. In one example, the first HARQ process may not determine whether ACK/NACK signals for the retransmission of the base layer signals are received. As stated above, when this scalable service has time constraint as like the case of SVC based streaming service, there can be a limitation on the further retransmission of the base layer signals. So, it would be better to perform link adaptation ensuring the successful reception rate for initial transmission of base layer signals up to 90% (to ensure the successful reception rate for retransmission become almost 100%).

Also in this embodiment, the time constraint may be managed by using timers. In one example, the eNB may start a first timer (T1) when the initial transmission of the base layer signals started (S710). And, eNB may cease transmission or retransmission of one or more of the base layer signals and the enhancement layer signals when the first timer (T1) expires. In this case, the conventional concept of maximum number of retransmission may not be used.

In the following, transmission scheme to ensure the better scalable service will be explained.

When the scalable service is assumed as SVC based streaming service, the both of the base layer signals and the enhancement layer signals are important. But, the successful reception of the base layer signals has more importance since it shall ensure the seamless streaming service. So, in one example of the present invention, it is proposed to allocated different transmission power to them. Also, the receiving side may decode the signals transmitted with high transmission power and decode the rest of the received signals without the decoded signals.

Figure 8:
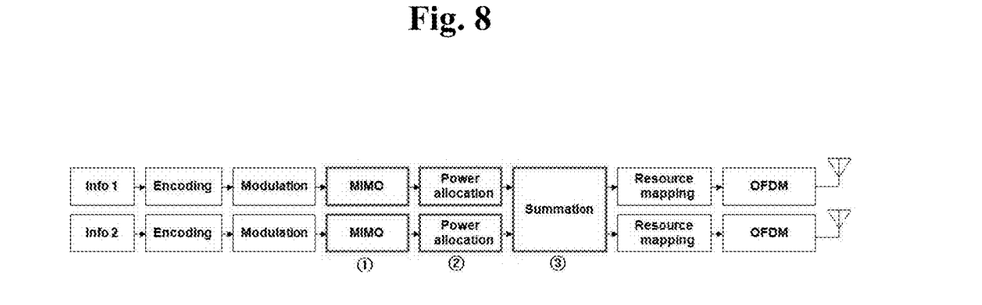
FIG. 8 is a diagram showing one example of transmission chain according one embodiment of the present invention.

FIG. 8 is a diagram showing one example of transmission chain according to one embodiment of the present invention.

Referring to FIG. 8, 'Info 1' represents information having higher priority (i.e. base layer signals). 'Info 2' represents information having lower priority (i.e. enhancement layer signals). For the Info 1, open-loop transmission, such as Alamouti scheme is used for robust transmission at step ①.

$$X_{11}(1)=S_{11}/\sqrt{2}, X_{11}(2)=S_{12}^*/\sqrt{2}$$

$$X_{21}(1)=S_{12}/\sqrt{2}, X_{11}(2)=-S_{11}^*/\sqrt{2} \quad \text{[Equation 1]}$$

One reason for open-loop transmission for Info 1 is that the subscribers of the base layer signals can be multiple UEs, so it can be broadcasted/multicasted. On the other hand, the subscriber of the Info 2 (enhancement layer signals) can be a single UE for high quality service. So, for Info 2, closed-loop transmission would be more suitable. In this example, beam forming transmission is used for Info 2 at step ①.

$$X_{12}(1)=w_1 S_{21}, X_{12}(2)=w_1 S_{22}$$

$$X_{22}(1)=w_2 S_{21}, X_{22}(2)=w_2 S_{22} \quad \text{[Equation 2]}$$

At steps ② and ③, power allocation and summation are performed and they can be represented as follows:

[Equation 3]

Tx Ant 1. $X_1(i) = \alpha X_{11}(i) + \beta X_{12}(i)$
Tx Ant 2. $X_2(i) = \alpha X_{21}(i) + \beta X_{22}(i)$
Summation In preferred example, power allocated to Info 1 ($\alpha$) is higher than that allocated to Info 2 ($\beta$).

In another example, Info 1 may be transmitted based on open loop transmission and Info 2 may be transmitted based on closed loop transmission.

In order for the receiving side to correctly decode the received signals, it would be better for the transmitting side to provide information on different power allocation to each of Info. 1 and Info. 2. The received signals can be represented as following:

[Equation 4]

$$Y(i) = H_1 X_1(i) + H_2 X_2(i) = H_1(\alpha X_{11}(i) + \beta X_{12}(i)) + H_2(\alpha X_{21}(i) + \beta X_{22}(i)) \implies$$

$$Y(1) = H_1(\alpha\, S_{11}/\sqrt{2} + \beta w_1 S_{21}) + H_2(\alpha\, S_{12}/\sqrt{2} + \beta w_2 S_{21}) = \alpha H_1 S_{11}/\sqrt{2} + \alpha H_2 S_{12}/\sqrt{2} + (\beta w_1 H_1 + \beta w_2 H_2) S_{21}$$

$$Y(2) = H_1(\alpha\, S_{12}^*/\sqrt{2} + \beta w_1 S_{22}) + H_2(-\alpha\, S_{11}^*/\sqrt{2} + \beta w_2 S_{22}) = \alpha H_1 S_{12}^*/\sqrt{2} - \alpha H_2 S_{11}^*/\sqrt{2} + (\beta w_1 H_1 + \beta w_2 H_2) S_{21}$$

Even when the receiving side estimate H1 and H2 based on reference signals, the information on $\alpha$ and $\beta$ is required to correctly decode the signals.

Figure 9:
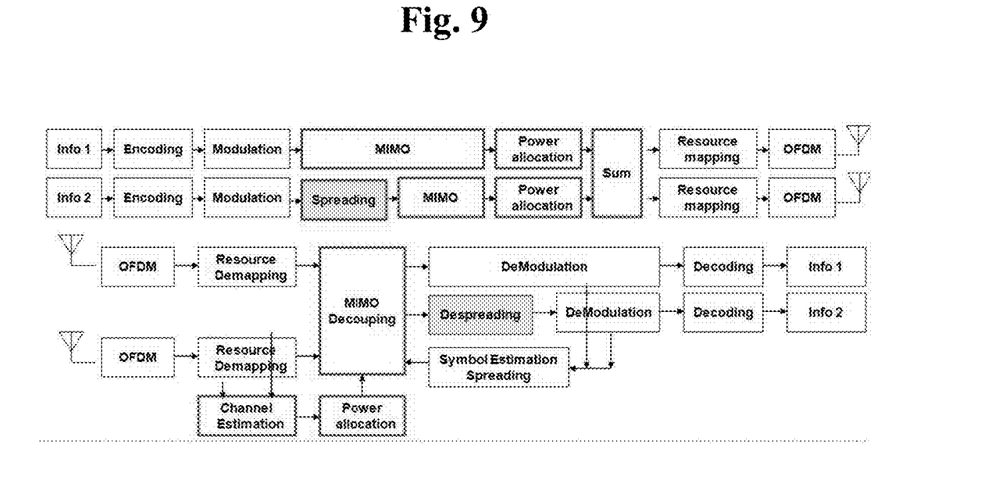
FIG. 9 is a diagram showing another example of transmission and reception chain according one embodiment of the present invention.

FIG. 9 is a diagram showing another example of transmission and reception chain according to one embodiment of the present invention.

In this example, symbol spreading is performed on specific information (e.g. Info. 2) in addition to the different power allocation on each signal. In this example, information with higher priority (e.g. Info. 1) is modulated at low rate and separately MIMO encoded. On contrary, information with lower priority (e.g. Info. 2) is modulated at high rate and also separately MIMO encoded. Also, Info. 2 is spread in a group based on DFT spreading, Hadamad transform etc. This scheme is efficient when the Info. 2 is multiplexed signals for plurality of users.

At a receiving side, demodulated Info. 1 is deducted from the received signals and Info 2. is acquired based on it.

In the above scalable service, Info. 1 (base layer signal) can be transmitted via broadcasting/multicasting channel (e.g. MBSFN subframe, PMCH (Physical Multicast Channel), etc) and Info. 2 (enhancement layer signal) can be transmitted via unicast channel (PDSCH).

Figure 10:
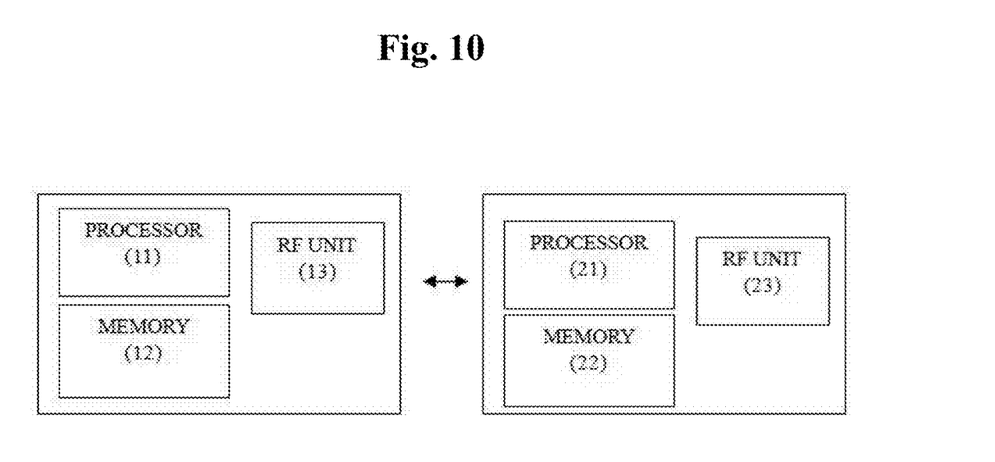
FIG. 10 is a block diagram of a communication apparatus according to an embodiment of the present invention.

FIG. 10 is a block diagram of a communication apparatus according to an embodiment of the present invention.

The apparatus shown in FIG. 10 can be a user equipment (UE) and eNB adapted to receive the above scalable service, but it can be any apparatus for receiving the same.

As shown in FIG. 10, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for providing scalable service in a wireless communication system, the method comprising:
   simultaneously transmitting base layer signals and enhancement layer signals for a scalable service to a user equipment (UE) based on a Hybrid Automatic Repeat Request (HARQ) scheme,
   wherein the base layer signals can be independently used at the UE without the enhancement layer signals, and wherein the enhancement layer signals cannot be used at the UE without the base layer signals;
   receiving a first type of ACK/NACK signal for the base layer signals and a second type of ACK/NACK signal for the enhancement layer signals from the UE; and
   retransmitting the base layer signals before a retransmission of the enhancement layer signals when both the base layer signals and the enhancement layer signals are to be retransmitted based on the ACK/NACK signals,
   wherein the transmission of the base layer signals is managed by one or more first HARQ processes, and the transmission of the enhancement layer signals is managed by one or more second HARQ processes,
   wherein a first HARQ process determines whether the first type of ACK/NACK signal is received, and does not determine whether the second type of ACK/NACK signal is received, and
   wherein a second HARQ process determines whether the first type of ACK/NACK signal is received and whether the second type of ACK/NACK signal is received.

2. The method of claim 1, further comprising:
   retransmitting the enhancement layer signals when the enhancement layer signals are to be retransmitted and there are no base layer signals to be retransmitted.

3. The method of claim 1, wherein, after successful transmission of the base layer signals, the second HARQ process does not determine whether the first type ACK/NACK signal is received and whether the second type ACK/NACK signal is received.

4. The method of claim 1, wherein the scalable service comprises a service for providing encoded video signals based on scalable video coding (SVC).

5. The method of claim 4, wherein the base layer signals are used at the UE for High Definition (HD) service, and wherein the base layer signals and the enhancement layer signals are used at the UE for Ultra High Definition (UHD) service.

6. The method of claim 4, further comprising:
   starting a first timer (T1) when the initial transmission of the base layer signals and the enhancement layer signals starts; and
   ceasing transmission or retransmission of one or more of the base layer signals and the enhancement layer signals when the first timer (T1) expires even when there are base layer signals and enhancement layer signals to be retransmitted.

7. The method of claim 6, wherein the HARQ scheme does not use a maximum number of retransmissions for the transmission of the base layer signals and the enhancement layer signals.

8. A base station (BS) providing a scalable service in a wireless communication system, the BS comprising:
   a transmitter and a receiver; and
   a processor that:
   controls the transmitter to simultaneously transmit base layer signals and enhancement layer signals for the scalable service to a user equipment (UE) based on a Hybrid Automatic Repeat Request (HARQ) scheme,
   wherein the base layer signals can be independently used at the UE without the enhancement layer signals, and wherein the enhancement layer signals cannot be used at the UE without the base layer signals;
   controls the receiver to receive a first type of ACK/NACK signal for the base layer signals and a second type of ACK/NACK signal for the enhancement layer signal from the UE, and
   controls the receiver to receive retransmitted base layer signals before a retransmission of the enhancement layer signals when both the base layer signals and the enhancement layer signals are to be retransmitted based on the ACK/NACK signals,
   wherein the transmission of the base layer signals is managed by one or more first HARQ processes, and the transmission of the enhancement layer signals is managed by one or more second HARQ processes,
   wherein a first HARQ process determines whether the first type of ACK/NACK signal is received, and does not determine whether the second type of ACK/NACK signal is received, and
   wherein a second HARQ process determines whether the first type of ACK/NACK signal is received and whether the second type of ACK/NACK signal is received.

* * * * *